United States Patent
Shibata et al.

(10) Patent No.: US 10,071,440 B2
(45) Date of Patent: Sep. 11, 2018

(54) DEVICE FOR PRODUCING METAL MEMBER

(71) Applicant: KOMATSU LTD., Tokyo (JP)

(72) Inventors: Yoshitaka Shibata, Hirakata (JP); Atsushi Saitou, Shimotsuma (JP); Masaharu Amano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/329,649

(22) PCT Filed: Aug. 29, 2014

(86) PCT No.: PCT/JP2014/072832
§ 371 (c)(1),
(2) Date: Jan. 27, 2017

(87) PCT Pub. No.: WO2016/031074
PCT Pub. Date: Mar. 3, 2016

(65) Prior Publication Data
US 2017/0203383 A1 Jul. 20, 2017

(51) Int. Cl.
*B23K 20/00* (2006.01)
*B23K 20/12* (2006.01)
(Continued)

(52) U.S. Cl.
CPC ........... *B23K 20/12* (2013.01); *F03C 1/06* (2013.01); *F03C 1/0605* (2013.01); *F04B 1/124* (2013.01);
(Continued)

(58) Field of Classification Search
CPC .. B23K 20/122; B23K 20/123; B23K 20/126; B23K 20/1255
(Continued)

(56) References Cited

U.S. PATENT DOCUMENTS 3,924,508 A 12/1975 DeCaro
5,154,340 A 10/1992 Peacock
(Continued)

FOREIGN PATENT DOCUMENTS

| CN | 1281533 A | 1/2001 |
|---|---|---|
| CN | 101259568 A | 9/2008 |
| JP | S51-135857 A | 11/1976 |
| JP | H10-89241 A | 4/1998 |
| JP | H10-118777 A | 5/1998 |

(Continued)

OTHER PUBLICATIONS

Nov. 18, 2014 International Search Report issued in International Patent Application No. PCT/JP2014/072832.

*Primary Examiner* — Erin B Saad
(74) *Attorney, Agent, or Firm* — Oliff PLC

(57) ABSTRACT

A metal member producing device includes a spindle, a base portion, and a driving portion which drives at least one of the spindle and the base portion in an axial direction of the spindle. Of the spindle and the base portion, one includes a first holding portion for holding a first member. The other has disposed thereon a mold for holding a second member to oppose the first holding portion. The mold includes a bottom wall and a sidewall that extends from the bottom wall in a direction intersecting the bottom wall. The sidewall has a resistive wall formed thereon, the resistive wall being a wall surface inclined with respect to a plane parallel to the axial direction of the spindle so as to face the bottom wall side.

4 Claims, 10 Drawing Sheets

(51) Int. Cl.
*F04B 1/22* (2006.01)
*F04B 27/08* (2006.01)
*F03C 1/06* (2006.01)
*F04B 1/12* (2006.01)
*F04B 53/14* (2006.01)
*F03C 1/28* (2006.01)
*F01B 31/26* (2006.01)

(52) U.S. Cl.
CPC ............... *F04B 1/22* (2013.01); *F04B 27/08* (2013.01); *F04B 27/0886* (2013.01); *F04B 53/14* (2013.01); *F01B 31/26* (2013.01)

(58) Field of Classification Search
USPC .............. 228/2.1, 112.1, 114.5, 2.3, 102, 1.1
See application file for complete search history.

(56) References Cited

U.S. PATENT DOCUMENTS

| | | | |
|---|---|---|---|
| 6,092,457 A | 7/2000 | Inoue et al. | |
| 6,425,314 B1 | 7/2002 | Kleinedler et al. | |
| 2005/0006441 A1* | 1/2005 | Adams | B23K 20/123 228/114.5 |
| 2012/0227890 A1* | 9/2012 | Yamauchi | B23K 20/124 156/73.5 |

FOREIGN PATENT DOCUMENTS

| | | |
|---|---|---|
| JP | H11-50950 A | 2/1999 |
| JP | 2005-125344 A | 5/2005 |
| JP | 5184320 B2 | 4/2013 |

* cited by examiner

DEVICE FOR PRODUCING METAL MEMBER

TECHNICAL FIELD

The present invention relates to devices for producing metal members, and more specifically, to a device for producing a metal member having a structure in which members made of different metals are joined to each other.

BACKGROUND ART

A metal member having members made of different metals fixed to each other may be used as a machine component. For example, a known piston shoe for a hydraulic pump or a hydraulic motor has a base section made of steel, and a sliding section made of copper alloy which is fixed to the base section. As a piston shoe of this type, one having the sliding section fixed to the base section by caulking may be used.

In order for the sliding section to be fixed to the base section by caulking, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in Patent Literature 1 above, the sliding section is merely fixed to the base section by engagement. If the piston shoe receives an impact, for example, the fixed state of the sliding section to the base section may become unstable.

The present invention has been accomplished to solve the above-described problem, and an object of the present invention is to provide a device for producing a metal member having a structure in which members made of different metals are directly joined firmly to each other.

Solution to Problem

A device for producing a metal member according to the present invention is a metal member producing device for producing a metal member by joining a first member made of a first metal and a second member made of a second metal. The metal member producing device includes: a spindle; a base portion arranged spaced apart from the spindle in an axial direction; and a driving portion configured to drive at least one of the spindle and the base portion in the axial direction of the spindle. Of the spindle and the base portion, one includes a first holding portion for holding the first member, and the other has disposed thereon a mold for holding the second member to oppose the first holding portion. The mold includes a bottom wall, and a sidewall extending from the bottom wall in a direction that intersects the bottom wall. The sidewall has a resistive wall formed thereon, the resistive wall being a wall surface inclined with respect to a plane parallel to the axial direction of the spindle so as to face the bottom wall side.

The present inventors studied about the way of directly joining members made of different metals firmly to each other. As a result, they have obtained the following knowledge to conceive the present invention. When a first member, in a state in contact with a second member disposed in a mold, is relatively rotated about a rotational axis, without changing the relative positional relationship with the second member, the first and second members are heated. The first and second members are then cooled while being maintained in the state in contact with each other, whereby the first and second members are directly joined to each other. The first and second members are heated with the heat of friction that is generated as the first member slides relative to the second member, whereby the first and second members are joined. At this time, a region (unjoined region) where the first and second members are not joined to each other may be formed in a part of the joint surface between the first and second members, specifically in a region including the center of rotation of the first member. The existence of such an unjoined region lowers the joint strength of the first and second members.

When the first and second members are heated with the first member being rotated in the state in contact with the second member disposed in the mold, the second member made of the second metal deforms, because its deformation resistance is smaller than that of the first member in the heated state. This causes a part of the second member to penetrate into a gap between the first member and the sidewall of the mold, thereby forming flash. When such flash becomes large, the unjoined region described above is more likely formed. This is presumably because part of the frictional heat resulting from friction between the first and second members is drained off to the flash, so the frictional heat that should contribute to the joining becomes insufficient in the vicinity of the joint surface.

In the case where the metal member producing device according to the present invention is used, while the spindle is rotated about the axis with the first member held in the first holding portion, the spacing between the spindle and the base portion is adjusted by the driving portion to cause the first member to be pressed against the second member held in the mold, so the first and second members are heated. Thereafter, the first and second members, held in contact with each other, are cooled, whereby the first and second members are joined. The flash described above grows along the sidewall of the mold in a direction away from the bottom wall. In the metal member producing device according to the present invention, on the sidewall of the mold, the resistive wall is formed which is the wall surface inclined with respect to a plane parallel to the axial direction of the spindle so as to face the bottom wall side. This resistive wall suppresses the growth of the flash. The frictional heat that is drained off to the flash is reduced, so the frictional heat that should contribute to the joining remains in a large amount in the vicinity of the joint surface. As a result, the formation of an unjoined region is restricted, whereby firm joining is achieved between the first and second members. Thus, according to the metal member producing device of the present invention, it is possible to produce a metal member having members made of different metals directly joined firmly to each other.

In the metal member producing device described above, the resistive wall may be a wall surface constituting a recess or a projection formed on the sidewall. This facilitates formation of the resistive wall on the sidewall.

In the metal member producing device described above, the resistive wall may extend to approach the bottom wall in a direction of rotation of the first member. This more reliably suppresses the growth of the flash.

In the metal member producing device described above, at least one of the spindle and the base portion may have mounted thereon a load sensor for detecting a contact load between the first member and the second member. This facilitates adjusting the contact load between the first and second members to an appropriate range.

A metal member producing method that can be implemented using the metal member producing device according to the present invention includes the steps of: preparing a first member made of a first metal and a second member made of a second metal; disposing the second member in a mold having a bottom wall and a sidewall extending from the bottom wall in a direction that intersects the bottom wall; heating the first member and the second member by causing the first member, held in contact with the second member disposed in the mold, to relatively rotate about a rotational axis without changing a relative positional relationship with the second member; and joining the first member and the second member by cooling the heated first and second members in the state in contact with each other. In the step of disposing the second member, the second member is disposed so as to be in contact with the bottom wall of the mold and surrounded by the sidewall. In the step of heating the first member and the second member, the second metal is smaller in deformation resistance than the first metal in the heated state. The sidewall has a resistive wall formed thereon, the resistive wall being a wall surface inclined with respect to a plane parallel to the axial direction of the spindle so as to face the bottom wall side.

In the metal member producing method described above, on the sidewall of the mold, the resistive wall is formed which is the wall surface inclined with respect to a plane parallel to the axial direction of the spindle so as to face the bottom wall side. The flash described above grows along the sidewall of the mold, in a direction away from the bottom wall. The resistive wall stops such growth of the flash. The frictional heat that is drained off to the flash is thus reduced, so the frictional heat that should contribute to the joining remains in a large amount in the vicinity of the joint surface. As a result, the formation of an unjoined region is suppressed, whereby firm joining between the first and second members is achieved. Thus, according to the metal member producing method described above, it is possible to produce a metal member having members made of different metals directly joined firmly to each other.

In the metal member producing method described above, the resistive wall may be a wall surface constituting a recess or a projection formed on the sidewall. This facilitates formation of the resistive wall on the sidewall.

In the metal member producing method described above, the resistive wall may extend to approach the bottom wall in a direction of rotation of the first member. This more reliably suppresses the growth of the flash.

In the metal member producing method described above, in the step of heating the first member and the second member, the first and second members may be heated in a state where a release agent is present within the mold.

With the use of the release agent, the metal member can easily be separated from the mold. The use of the release agent, however, may accelerate the growth of the flash. By adopting the metal member producing method of the present invention where the resistive wall is formed on the sidewall of the mold, it is possible to suppress the growth of the flash effectively, even in the case where the growth of the flash is promoted by the presence of the release agent.

Effects of the Invention

As is clear from the above description, according to the metal member producing device in the present invention, it is possible to produce a metal member having a structure in which members made of different metals are directly joined firmly to each other.

DESCRIPTION OF EMBODIMENTS

Figure 1:
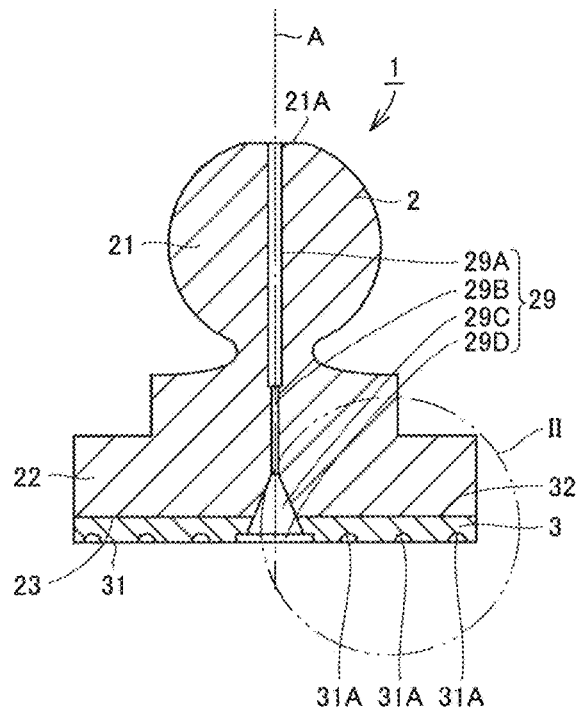
FIG. 1 is a schematic cross-sectional view showing the structure of a piston shoe.

An embodiment of the present invention will now be described. In the following drawings, the same or corresponding parts are denoted by the same reference numerals, and the description thereof will not be repeated.

FIG. 1 is a schematic cross-sectional view showing the structure of a piston shoe which is an example of a metal member (machine component) that can be produced by the metal member producing device according to the present invention. Referring to FIG. 1, the piston shoe 1 is a component which is connected to a piston body (not shown) of a hydraulic pump or a hydraulic motor and slides with respect to a swash plate. The piston shoe 1 includes a base section 2 (first member) made of steel (first metal), and a sliding section 3 (second member) made of copper alloy (second member) which is joined to the base section 2. The sliding section 3 has a sliding surface 31 formed thereon. For the steel forming the base section 2, for example, alloy steel for machine structural use (such as JIS SCM440) or carbon steel for machine structural use that has undergone thermal refining, or, quenching and tempering can be adopted. The base section 2 includes a spherical portion 21 of a spherical shape, which is to be swingably connected to the piston body, and a disk portion 22 of a stepped disk shape, which is connected to the spherical portion 21.

The spherical portion 21 is swingably held by a holding portion (not shown) having a spherical inner wall, formed in the piston body. At an end of the spherical portion 21 opposite to the side connected to the disk portion 22, a planar flat part 21A is formed. At an end of the disk portion 22 opposite to the spherical portion 21 side, a planar base section joint surface 23 (first member joint surface) is formed.

The base section joint surface 23 is joined with the sliding section 3, which is of a disk shape and smaller in thickness than the disk portion 22. The sliding section 3 is joined, at one main surface constituting a sliding section joint surface 32 (second member joint surface), to the base section joint surface 23 of the disk portion 22. The other main surface of the sliding section 3 serves as the sliding surface 31. This sliding surface 31 slides with respect to a swash plate (not shown) of a hydraulic pump, for example. The sliding section 3, made of copper alloy having excellent sliding characteristics, reduces the frictional force between the swash plate and the piston shoe 1. For the copper alloy forming the sliding section 3, brass such as high-strength brass, as well as bronze such as aluminum bronze, can be adopted. In the present embodiment, the sliding section 3 is made of high-strength brass. Further, the sliding surface 31 has a plurality of annular grooves 31A formed concentrically. These grooves 31A hold a proper amount of oil, thereby further reducing the frictional force between the swash plate and the piston shoe 1.

The piston shoe 1 has a shape which is symmetrical about the central axis A. The piston shoe 1 has a linear center hole 29 which is formed in the region including the central axis A to penetrate through the piston shoe 1 from the flat part 21A of the spherical portion 21 to the sliding surface 31 of the sliding section 3. The center hole 29 includes a first region 29A, a second region 29B, a third region 29C, and a fourth region 29D. The first region 29A extends from the flat part 21A in the direction of the sliding surface 31. The second region 29B is connected to the first region 29A, and has a cross section perpendicular to the longitudinal direction (along the axis A) smaller in area than that of the first region 29A. The third region 29C is connected to the second region 29B, and has a cross section perpendicular to the axial direction increasing in area as it approaches the sliding surface 31. The fourth region is connected to the third region 29C, and has a cross section perpendicular to the axial direction larger in area than that of the third region 29C.

Figure 2:
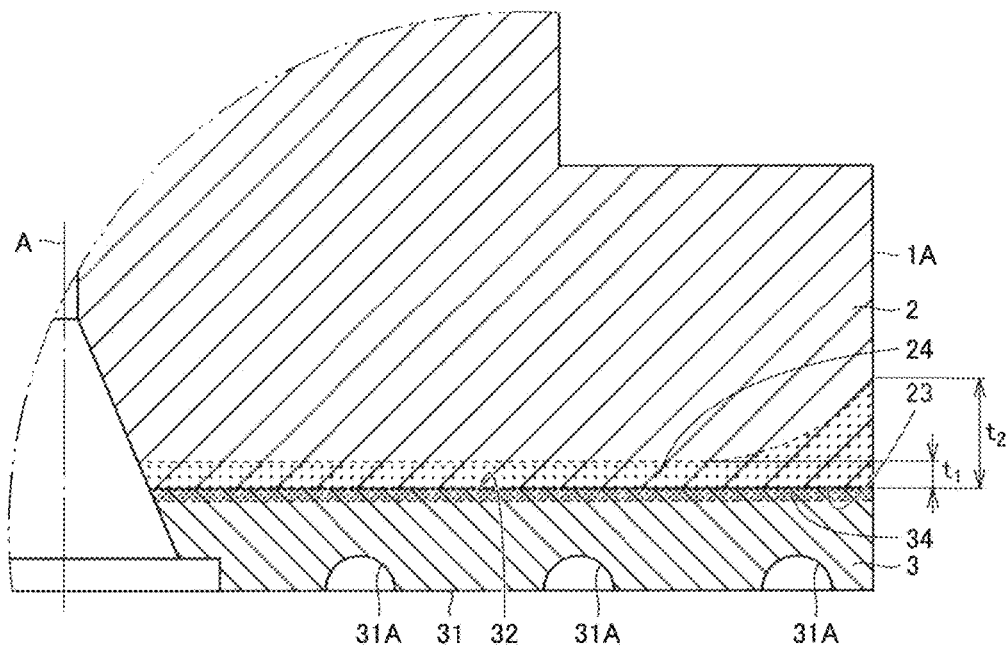
FIG. 2 is a schematic cross-sectional view showing, in enlarged view, the region II in FIG. 1.

The structure near the joint portion between the base section 2 and the sliding section 3 will now be described. FIG. 2 is an enlarged schematic cross-sectional view of the region II in FIG. 1. Referring to FIG. 2, the base section 2 is directly joined to the sliding section 3, with a base section joint region 24 being formed in the base section 2, the base section joint region 24 including the base section joint surface 23 and having smaller grains than other regions in the base section 2.

In the piston shoe 1 of the present embodiment, the sliding section 3 is metallurgically joined to the base section 2 in which the base section joint region 24 having smaller grains than other regions in the base section 2 has been formed. That is, the piston shoe 1 has a structure in which the base section joint region 24 excellent in toughness due to the small grains therein and the sliding section 3 are joined metallurgically (a structure in which the base section joint region 24 and the sliding section 3 are joined directly). Thus, the sliding section 3 is stably fixed to the base section 2. As such, the piston shoe 1 is a metal member (sliding component) having the sliding section 3 stably fixed to the base section 2.

Here, referring to FIG. 2, the thickness $t_2$ of the base section joint region 24 in the region including a surface 1A of the piston shoe 1 may be greater than the thickness $t_1$ of the base section joint region 24 in the inside. This ensures that, in the vicinity of the joint surface, high toughness is more reliably imparted to the surface region of the base section 2 from which cracking may start. In the present embodiment, the base section joint region 24 has its thickness increasing gradually as it approaches the surface 1A of the piston shoe 1.

Further, in the sliding section 3, a sliding section joint region 34 having a lower hardness than other regions in the sliding section 3 may be formed to include the sliding section joint surface 32, which is the surface joined to the base section 2. This can relieve the strain in the joint portion between the sliding section 3 and the base section 2.

It is preferable that the sliding section joint region 34 has a thickness of 0.2 mm or less in the direction perpendicular to the sliding section joint surface 32. By making the sliding section joint region 34 no thicker than necessary, it is possible to impart sufficient strength to the sliding section 3.

Further, the high-strength brass forming the sliding section 3 may include precipitates having a higher hardness than the matrix, and the precipitates in the sliding section joint region 34 may be smaller in size than the precipitates in other regions in the sliding section 3. This can improve the toughness of the sliding section in the vicinity of the joint portion.

Further, a precipitate aggregate as an aggregate of the precipitates may be formed in a region, within the sliding section joint region 34, that is in contact with the sliding section joint surface 32. The aggregate of fine precipitates formed in the vicinity of the sliding section joint surface 32 can improve the strength in the vicinity of the sliding section joint surface 32, without significantly decreasing toughness.

Furthermore, the sliding section joint region 34 may have a higher volume fraction of a phase than other regions. This can improve the toughness of the sliding section 3 in the vicinity of the joint portion.

Figure 3:
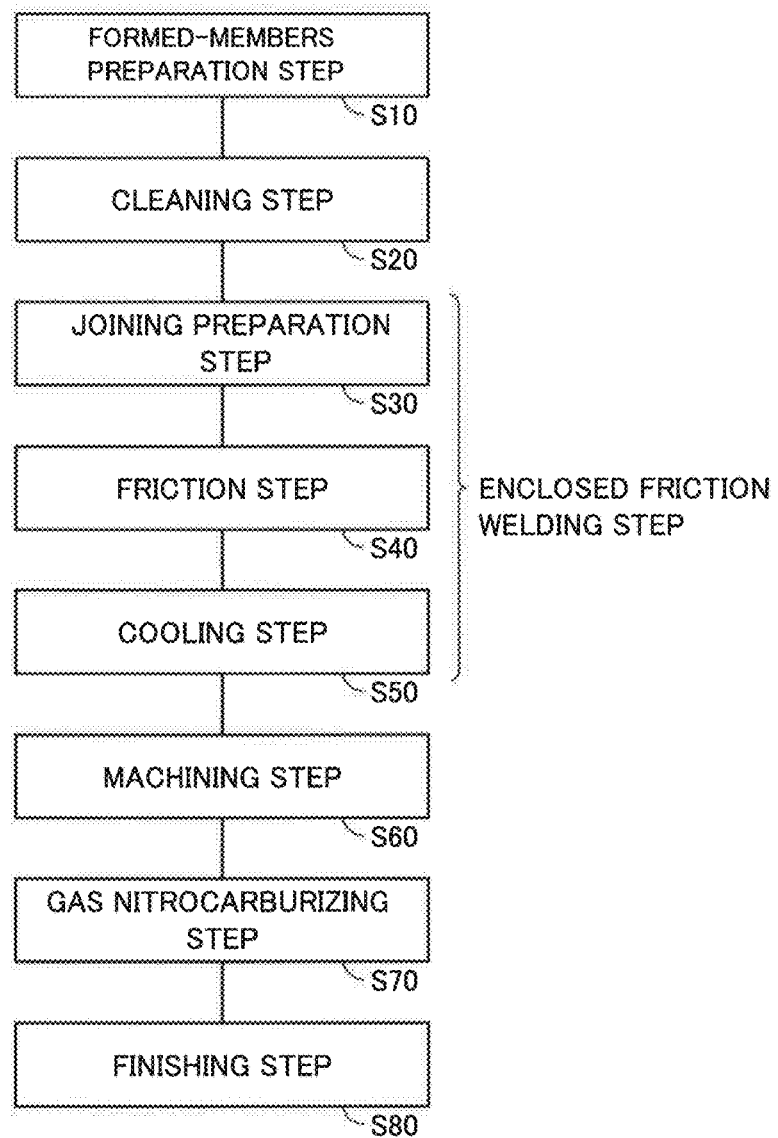
FIG. 3 is a flowchart schematically illustrating a method for producing a piston shoe.
Figure 4:
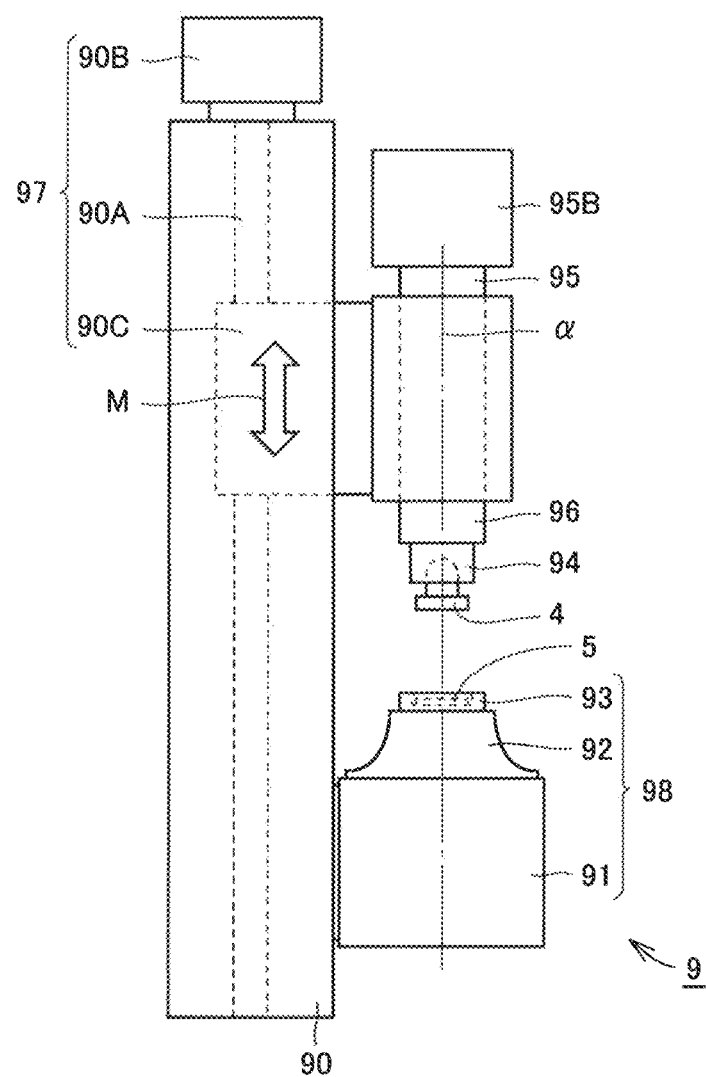
FIG. 4 is a schematic diagram showing the structure of a device for producing a piston shoe.
Figure 5:
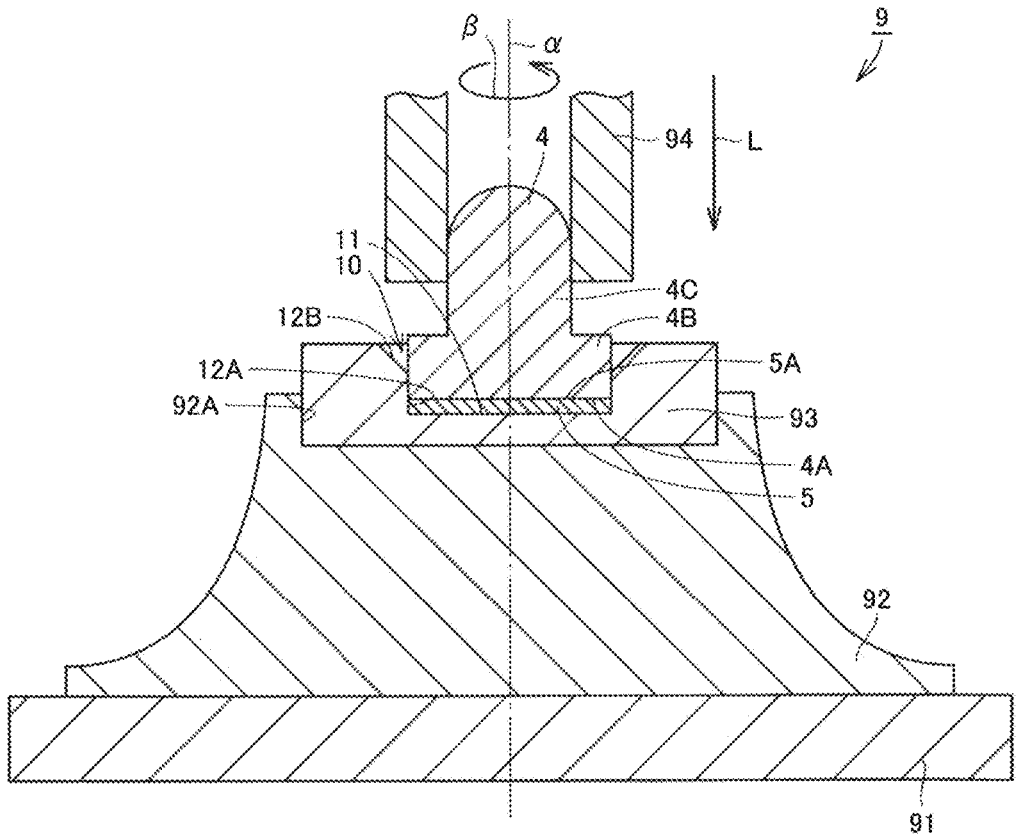
FIG. 5 is a schematic cross-sectional view showing the operation of the device for producing a piston shoe.
Figure 6:
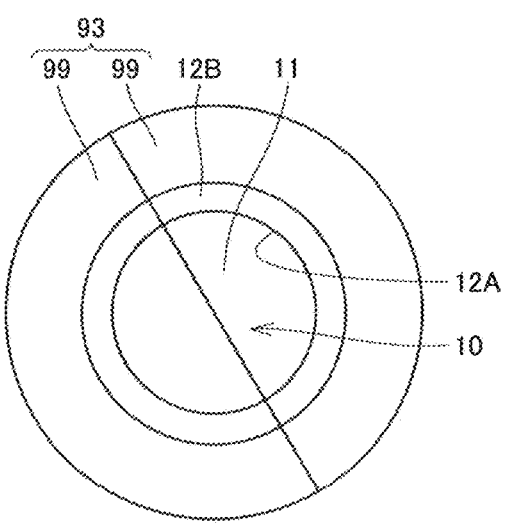
FIG. 6 is a schematic plan view showing the structure of a mold.
Figure 7:
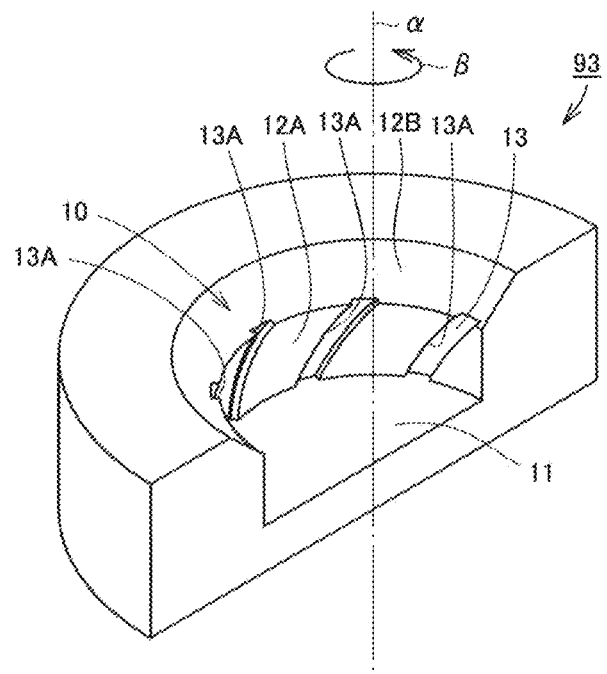
FIG. 7 is a schematic perspective view showing the structure of the mold.

A method for producing the above-described piston shoe 1 will now be described. FIG. 3 is a flowchart schematically illustrating the method for producing a piston shoe. FIG. 4 is a schematic diagram showing the structure of a device for producing a piston shoe. FIG. 5 is a schematic cross-sectional view showing the operation of the device for producing a piston shoe. FIG. 6 is a schematic plan view showing the structure of a mold included in the device for producing a piston shoe. FIG. 7 is a schematic perspective view showing the structure of the mold. In FIG. 7, one of the two halves of the mold is shown.

Referring to FIG. 3, in the method for producing the piston shoe 1 in the present embodiment, first, a formed-members preparation step is carried out as a step S10. In this step S10, referring to FIG. 5, a base member 4 (first member), made of thermally refined alloy steel for machine structural use, and a disk-shaped sliding member 5 (second member), made of high-strength brass, are prepared. The base member 4 includes a disk portion 4B of a disk shape, and a cylindrical portion 4C smaller in outer diameter than the disk portion and connected to the disk portion 4B. At an end of the disk portion 4B opposite to the cylindrical portion 4C side, a base member contact surface 4A (first member contact surface) is formed which is a flat surface to be joined to the sliding member 5. One main surface of the sliding member 5 serves as a sliding member contact surface 5A (second member contact surface) which is a flat surface to be joined to the base member 4.

Next, a cleaning step is carried out as a step S20. In this step S20, the base member 4 and the sliding member 5 prepared in the step S10 are cleaned. More specifically, the base member 4 and the sliding member 5 are cleaned using methanol, ethanol, acetone, or other liquid. This removes any foreign matters attached to the base member 4 or the sliding member 5 during the cutting, machining, or other processes for preparing the base member 4 and the sliding member 5. In the method for producing the piston shoe 1 in the present embodiment, precision finish work on the sliding member contact surface 5A may be omitted; the sliding member contact surface 5A may be left as cut, for example.

Next, referring to FIG. 3, an enclosed friction welding step is carried out. This enclosed friction welding step includes a joining preparation step, a friction step, and a cooling step. Here, a device for producing a piston shoe (metal member) which produces the piston shoe by conducting enclosed friction welding will be described.

Referring to FIG. 4, an enclosed friction welding device 9 which is the device for producing a piston shoe includes: a spindle 95 which is rotatable about an axis α, a base portion 98 disposed spaced apart from the spindle 95 in the axis α direction, a driving portion 97 which adjusts the spacing between the spindle 95 and the base portion 98 by driving the spindle 95 in the axis α direction, and a frame 90 which supports the spindle 95 and the base portion 98.

Referring to FIG. 4, inside the frame 90, a shaft 90A is disposed to extend in parallel with the axis α. This shaft 90A supports a spindle support portion 90C which supports the spindle 95, so as to allow the spindle support portion 90C to move in the direction in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis α direction. This enables adjustment of the spacing between the spindle 95 and the base portion 98. The shaft 90A, the spindle support portion 90C, and the spindle moving motor 90B constitute the driving portion 97.

A chuck 94 (first holding portion) and the mold 93 are arranged such that, in the state (as shown in FIG. 5) where the base member 4 and the sliding member 5 are brought into contact with each other with the spacing between the spindle 95 and the base portion 98 adjusted by the driving portion 97, a first sidewall 12A of a cavity 10 surrounds the outer periphery of the sliding member contact surface 5A, which is the surface of the sliding member 5 coming into contact with the base member 4. Referring to FIG. 5, the first sidewall 12A of the cavity 10 has a height in the axis α direction that is greater than the thickness of the sliding member 5.

Referring to FIG. 4, the spindle 95 includes the chuck 94, which is the first holding portion for holding the base member 4 to oppose the base portion 98. The spindle 95 has connected thereto a spindle motor 95B which rotatively drives the spindle 95 about the axis α. The spindle 95 further has mounted thereon a load sensor 96 which detects a contact load between the base member 4 and the sliding member 5. The load sensor 96 detects the contact load between the base member 4 and the sliding member 5 from the magnitude of the contact reaction force between the base member 4 and the sliding member 5 that is applied to the chuck 94. Although the load sensor 96 is not an indispensable component for the enclosed friction welding device 9, the sensor, when provided, facilitates adjusting the contact load between the base member 4 and the sliding member 5 to an appropriate range.

The base portion 98 has the mold 93 disposed thereon, which is a second holding portion for holding the sliding member 5 to oppose the chuck 94. More specifically, referring to FIGS. 4 and 5, the base portion 98 includes a base body 91, a mold holder 92, and the mold 93. The base body 91 is disposed on the frame 90. The mold holder 92 is fixed onto the base body 91. The mold 93 is fixedly fitted in a mold holding portion 92A which is a recessed portion formed in the mold holder 92. The mold 93 can be separated into two parts 99, 99, as shown in FIG. 6.

Referring to FIGS. 6 and 7, the mold 93 includes: a bottom wall 11 which is a circular, planar surface, a first sidewall 12A which extends from the bottom wall 11 in a direction intersecting (direction perpendicular to) the bottom wall 11, and a second sidewall 12B which is connected to the first sidewall 12A and extends in a direction away from the bottom wall 11. The bottom wall 11, the first sidewall 12A, and the second sidewall 12B define the cavity 10. The first sidewall 12A, which is connected to the outer periphery of the bottom wall 11 having a circular shape, has a cylindrical shape having the same diameter as the bottom wall 11. The second sidewall 12B, which is connected to the first sidewall 12A, has a conical shape having a diameter that increases with increasing distance from the bottom wall 11.

Referring to FIG. 7, a plurality of grooves 13 are formed on the first sidewall 12A. The grooves 13 are formed to extend from the bottom wall 11 side toward the second sidewall 12B side on the first sidewall 12A. The grooves 13 are each formed inclined with respect to the axial direction (along the axis α) such that it approaches the bottom wall 11 side from the second sidewall 12B side in the direction of rotation of the spindle 95 (indicated by the arrow β). Of the wall surfaces defining a groove 13, the wall surface that is inclined with respect to a plane parallel to the axis α direction of the spindle 95 so as to face the bottom wall 11 side is a resistive wall 13A. The resistive wall 13A is one of the wall surfaces defining the groove 13 that is on a side (front side in the direction of rotation of the spindle 95) opposite to the bottom wall side in the axis α direction. On the first sidewall 12A of the cavity 10, the resistive wall 13A is formed which is the wall surface inclined with respect to a plane parallel to the axis α direction of the spindle 95 so as to face the bottom wall 11 side. The resistive wall 13A is formed inclined such that it approaches the bottom wall 11 side from the second sidewall 12B side in the direction of rotation of the spindle 95. The resistive wall 13A is a wall surface constituting a recess formed on the first sidewall 12A.

Figure 8:
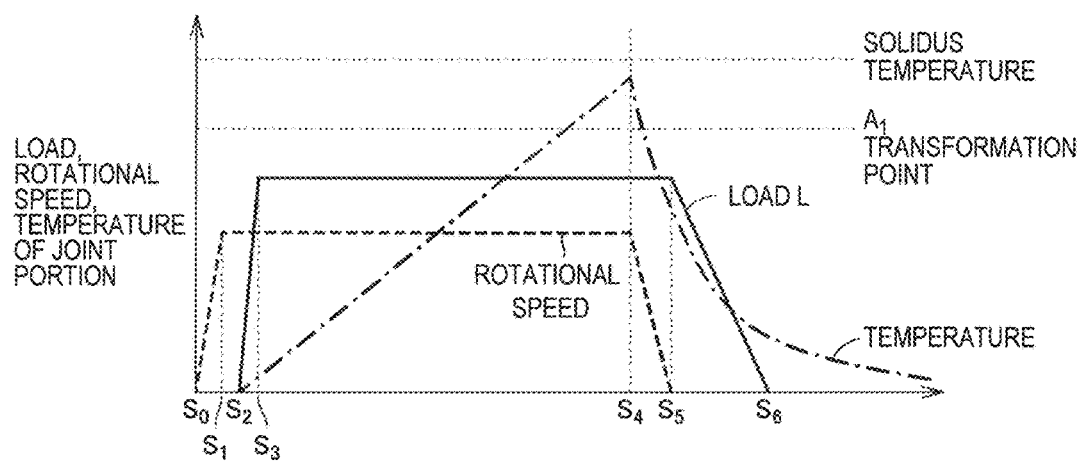
FIG. 8 shows changes over time of the rotational speed of a spindle, pressing load, and temperature of the joint portion during an enclosed friction welding step.

A specific procedure of the enclosed friction welding step will now be described. FIG. 8 shows changes over time of the rotational speed of the spindle 95, the contact load (pressing load) between the base member 4 and the sliding member 5, and the temperature of the joint portion between the base member 4 and the sliding member 5, during the enclosed friction welding step. Referring to FIGS. 4 and 5, in the joining preparation step carried out as a step S30, the base member 4 is held by the chuck 94 at the outer peripheral surface of the cylindrical portion 4C, and the sliding member 5 is set in the cavity 10 of the mold 93. At this time, the base member 4 and the sliding member 5 are arranged such that the base member contact surface 4A and the sliding member contact surface 5A oppose each other, and such that the central axes of the base member 4 and the sliding member 5 agree with the rotational axis α of the chuck 94. Further, a release agent is introduced into the cavity 10. Thus, in a step S40 described below, the base member 4 and the sliding member 5 are heated in the state where there exists the release agent in the cavity 10. Although introduction of the release agent is not an indispensable procedure, the release agent, when introduced, facilitates removal of a structural body formed with the base member 4 and the sliding member 5 joined, from the mold 93. The release agent may be liquid or powder.

Next, the friction step is carried out as a step S40. In this step S40, the spindle 95 is driven by the spindle motor 95B to rotate about the axis α, and it is also driven by the spindle moving motor 90B to approach the base portion 98. Consequently, the chuck 94 approaches the mold 93 while rotating about the axis α. At this time, referring to FIG. 8, the rotational speed of the spindle 95, which started rotating at time $S_0$, reaches a desired rotational speed at time $S_1$, and is maintained at the desired rotational speed thereafter. Further, at time $S_2$, the base member contact surface 4A comes into contact with the sliding member contact surface 5A, as shown in FIG. 5. Thus, the base member 4 rotates with respect to the sliding member 5, while being pressed against the sliding member 5 with load L, without changing its position relative to the sliding member 5. As a result, the temperature at the contact portion (joint portion) between the base member 4 and the sliding member 5 increases due to the frictional heat. Then, at time $S_3$, the pressing load (contact load between the base member contact surface 4A and the sliding member contact surface 5A) detected by the load sensor 96 reaches a desired level, and is maintained at the desired level thereafter. During this time, the temperature of the contact portion between the base member 4 and the sliding member 5 continues to increase.

Then, at time $S_4$, the temperature of the contact portion between the base member 4 and the sliding member 5 reaches a temperature that is not lower than the $A_1$ transformation point and lower than the solidus temperature. As a result, a region, within the base member 4, that includes the base member contact surface 4A is heated to a temperature not lower than the $A_1$ transformation point and lower than the solidus temperature, and the steel forming that region attains the austenite state including no liquid phase.

On the other hand, the heated sliding member 5 softens. As a result, even when the base member 4 rotates about the axis α, the sliding member 5 will not rotate in accordance therewith. Further, in such a heated state, high-strength brass (copper alloy) forming the sliding member 5 is smaller in deformation resistance than the alloy steel for machine structural use (steel) forming the base member 4. Thus, a part of the softened sliding member 5 penetrates into a gap between the outer peripheral surface of the disk portion 4B of the base member 4 and the first sidewall 12A of the cavity 10 of the mold 93, thereby forming flash. Such flash grows along the first sidewall 12A of the cavity 10 in a direction away from the bottom wall 11. On the first sidewall 12A of the cavity 10 of the mold 93 adopted in the present embodiment, the resistive wall 13A is formed, as described above, which is the wall surface inclined with respect to a plane parallel to the axis α direction of the spindle 95 so as to face the bottom wall 11 side. The resistive wall 13A stops the growth of the flash. Thus, the frictional heat that is drained off to the flash is reduced, so the frictional heat that should contribute to joining between the base member 4 and the sliding member 5 remains in a large amount in the vicinity of the joint surface. Particularly, the resistive wall 13A on the mold 93 adopted in the present embodiment extends so as to approach the bottom wall 11 in the direction of rotation of the base member 4, i.e., in the direction of rotation of the spindle 95 (see the direction indicated by the arrow β in FIG. 5). This stops the growth of the flash still more effectively.

Next, the cooling step is carried out as a step S50. In this step S50, first, the rotational speed of the spindle 95 is lowered, and the rotation is stopped at time $S_5$. Thereafter, the pressing load detected by the load sensor 96 is decreased. During this time, the contact portion between the base member 4 and the sliding member 5 is cooled, with the base member 4 and the sliding member 5 being maintained in the state of pressing each other. Accordingly, the base member 4 and the sliding member 5 are joined. Then, at time $S_6$, the pressing load is set to zero, and the structural body formed with the base member 4 and the sliding member 5 joined to each other is taken out from the enclosed friction welding device 9.

Here, the region within the base member 4 including the base member contact surface 4A, which was heated to a temperature not lower than the $A_1$ transformation point in the step S40, is cooled to a temperature lower than the $A_1$ transformation point in the step S50. In such a region that was once heated to a temperature not lower than the $A_1$ transformation point and then cooled to a temperature lower than the $A_1$ transformation point, the grains become finer. As a result, the base section joint region 24 having smaller grains than the other regions is formed (see FIG. 2). The enclosed friction welding step is completed through the above-described procedure.

Next, a machining step is carried out as a step S60. In this step S60, the structural body obtained in the step S50 is subjected to machining. Specifically, referring to FIG. 1, the outer peripheral surface of the sliding member 5 is machined to form the disk-shaped sliding section 3. Further, the cylindrical portion of the base member 4 is machined to form the spherical portion 21. The center hole 29, the flat part 21A, and the grooves 31A are also formed in this step.

Next, a gas nitrocarburizing step is carried out as a step S70. In this step S70, referring to FIG. 1, the gas nitrocarburizing processing is carried out in the state where the spherical portion 21 formed in the step S60 is fitted in a holding portion (not shown) having a spherical inner wall, formed in a piston body prepared separately. Specifically, while being heated within an atmosphere including ammonia gas to a temperature lower than the $A_1$ transformation point, nitrided layers are formed in the surface portions of the base member 4 (base section 2) and the piston body (not shown). At this time, with the heating for the gas nitrocarburizing processing, a region having a higher volume fraction of α phase than other regions is formed in a region, within the sliding member 5, that is in contact with the sliding member contact surface 5A. Accordingly, referring to FIG. 2, the volume fraction of the α phase in the sliding section joint region 34 becomes higher than in the other regions.

Next, a finishing step is carried out as a step S80. In this step, the base member 4, the sliding member 5, and the piston body (not shown), which have undergone the gas nitrocarburizing processing in the step S70, are subjected to finishing processing as required. Through the above procedure, the piston shoe 1 in the present embodiment is completed in the state being combined with the piston body.

As described above, according to the method for producing a piston shoe using the enclosed friction welding device 9 in the present embodiment, the piston shoe 1 of the present embodiment described above can be produced. Here, on the first sidewall 12A of the cavity 10 of the mold 93 adopted in the present embodiment, the resistive wall 13A is formed as described above, which is the wall surface inclined with respect to a plane parallel to the axis α direction of the spindle 95 so as to face the bottom wall 11 side. The resistive wall 13A stops the growth of the flash. The frictional heat that is drained off to the flash is thus reduced, so the frictional heat that should contribute to the joining of the base member 4 and the sliding member 5 remains in a large amount in the vicinity of the joint surface. As a result, the formation of an unjoined region is restricted, whereby firm joining between the base member 4 and the sliding member 5 is achieved.

Thus, according to the method for producing a piston shoe (metal member) using the enclosed friction welding device 9 in the present embodiment, it is possible to produce a piston shoe (metal member) having a structure in which members made of different metals are directly joined firmly to each other.

Further, referring to FIG. 5, as the base member 4 rotates, in the step S40, without changing its position relative to the sliding member, the circumferential velocity of the base member 4 with respect to the sliding member 5 increases with increasing distance from the axis α. The heat produced by friction thus increases on the outer peripheral side of the base member 4. As a result, the region within the base member 4 where the temperature exceeds the $A_1$ transformation point due to the frictional heat becomes larger in thickness on the outer peripheral side of the base member 4. Accordingly, referring to FIG. 2, the base section joint region 24 in which the grains are smaller than in the other regions can be made thicker on the outer peripheral side, i.e. in the region including the surface 1A of the piston shoe 1, than in the inside. Further, referring to FIG. 5, the cylindrical portion 4C of the base member 4 in the present embodiment described above has an outer diameter smaller than that of the disk portion 4B. This makes it difficult for the frictional heat produced in the outer peripheral portion of the base member contact surface 4A to be transmitted to the cylindrical portion 4C. As a result, the region within the base member 4 where the temperature exceeds the $A_1$ transformation point due to the frictional heat becomes still larger in thickness on the outer peripheral side of the base member 4. Therefore, according to the method for producing the piston shoe 1 in the present embodiment, it is readily possible to increase the thickness of the base section joint region 24 on the outer peripheral side, i.e. in the region including the surface 1A of the piston shoe 1, than in the inside.

Further, in the method for producing the piston shoe 1 in the present embodiment, referring to FIG. 5, the height of the first sidewall 12A in the axis α direction is greater than the thickness of the sliding member 5. As a result, in the steps S40 and S50, the state where the sliding member 5 is restrained on the outer peripheral side of the sliding member contact surface 5A is maintained. This can reduce the deformation amount of the softened sliding member 5. More specifically, in the piston shoe 1 produced, the sliding section joint region 34 formed by deformation of the sliding member 5 can be made to have a thickness of 0.2 mm or less in the direction perpendicular to the sliding section joint surface 32. As a result, the work amount in the machining work after the joining is reduced, leading to an improved yield of the material of the sliding member 5. Even in the case where the sliding member 5 is small in thickness, the plastically deformed region in the sliding member 5 is prevented from being exposed to the sliding surface 31 of the piston shoe 1, ensuring stable sliding characteristics of the sliding section 3. Further, the sliding section joint region 34 having a low hardness is made no thicker than it needs to be, whereby sufficient strength can be imparted to the sliding section 3.

While the case where the base member rotates while the sliding member is fixed has been described in the above embodiment, the method for producing a metal member using the metal member producing device according to the present invention is not limited thereto; the sliding member may rotate while the base member is fixed, or both members may rotate so that one slides relative to the other.

Further, in the above embodiment, the enclosed friction welding device 9 (device for producing a sliding component which is the metal member) was explained as the structure in which the spindle is movable in the axial direction. The device for producing a sliding component according to the present invention, however, is not limited thereto; the base portion may be movable in the axial direction.

Furthermore, in the above embodiment, the case where the cavity 10 of the mold 93 is of a circular shape in a planar view (as seen in the direction along the axis α) was explained. The mold adoptable, however, is not limited thereto; the holding portion may be of a polygonal shape, for example.

In the above embodiment, the piston shoe was described as an example of the metal member. The metal member produced by the metal member producing device according to the present invention, however, is not limited thereto; a variety of metal members including a machine component having members made of different metals directly joined to each other may be produced. More specifically, while a combination of steel and copper alloy was described as a combination of the first metal and the second metal in the above embodiment, a variety of combinations may be adopted which include, for example, a combination of cast iron and copper alloy, a combination of steel and aluminum alloy, a combination of nickel-based superalloy and steel, and a combination of cemented carbide and steel.

Molds of other structures adoptable in the metal member producing device in the present embodiment will now be described.

First Modification

Figure 9:
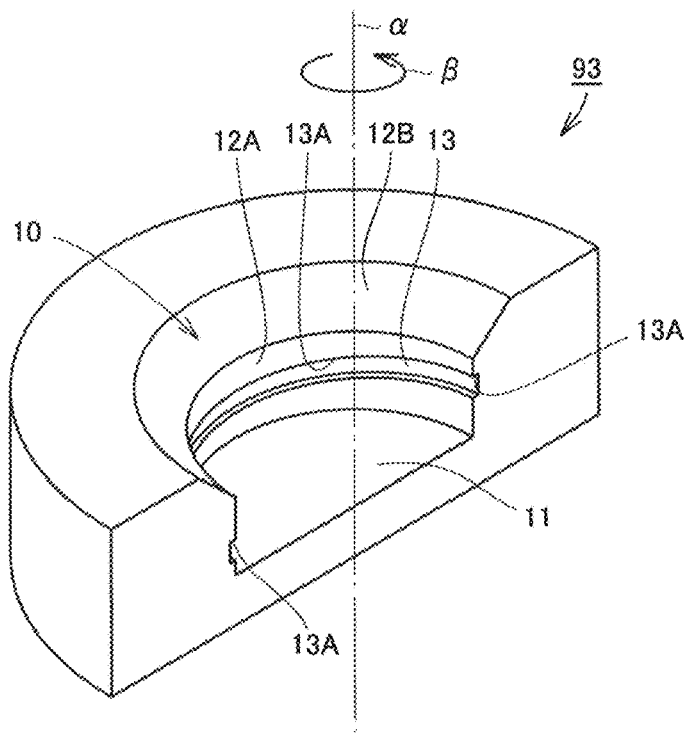
FIG. 9 is a schematic perspective view showing the structure of a mold according to a first modification.

FIG. 9 is a schematic perspective view showing the structure of a mold according to a first modification. Referring to FIG. 9, a mold 93 in the first modification basically has a similar structure and exerts similar effects as the mold 93 in the above embodiment. The mold 93 in the first modification, however, is different from that in the above embodiment in the manner of forming the resistive wall.

Specifically, referring to FIG. 9, a groove 13 is formed on the first sidewall 12A. The groove 13 is formed helically to extend in the circumferential direction of the first sidewall 12A. The groove 13 is formed helically such that, in the direction of rotation of the spindle 95 (direction of the arrow β), it approaches the bottom wall 11 side from the second sidewall 12B side. Of the wall surfaces defining the groove 13, the wall surface that is inclined with respect to a plane parallel to the axis α direction of the spindle 95 so as to face the bottom wall 11 side is a resistive wall 13A. The resistive wall 13A is, of the wall surfaces defining the groove 13, the wall on a side (front side in the direction of rotation of the spindle 95) opposite to the bottom wall in the axis α direction. On the first sidewall 12A of the cavity 10, the resistive wall 13A being the wall surface inclined with respect to a plane parallel to the axis α direction of the spindle 95 so as to face the bottom wall 11 side is formed. The resistive wall 13A is formed helically to approach the bottom wall 11 side from the second sidewall 12B side in the direction of rotation of the spindle 95. Of the wall surfaces defining the groove 13, the wall surface opposing the resistive wall 13A faces the opening side of the mold 93. The resistive wall 13A is a wall surface constituting a recess formed on the first sidewall 12A.

Second Modification

Figure 10:
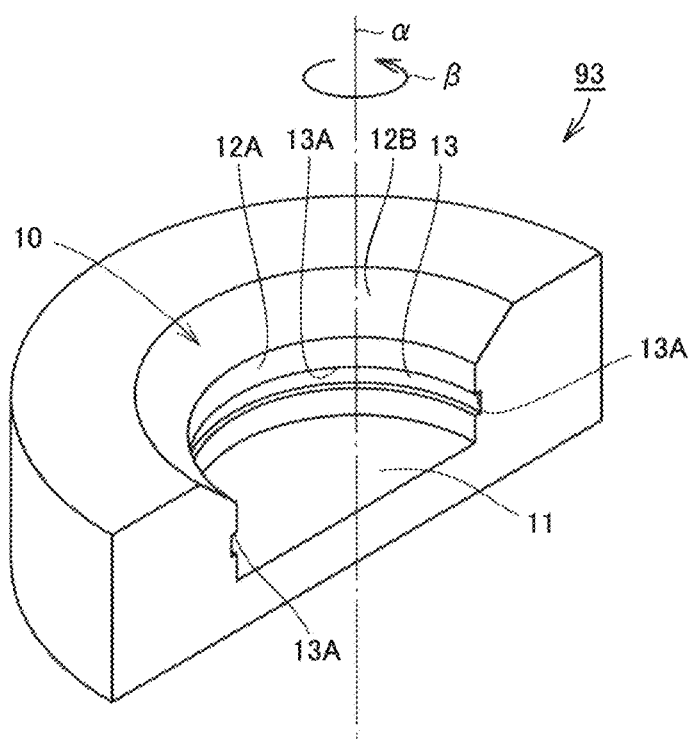
FIG. 10 is a schematic perspective view showing the structure of a mold according to a second modification.

FIG. 10 is a schematic perspective view showing the structure of a mold according to a second modification. Referring to FIG. 10, a mold 93 in the second modification basically has a similar structure and exerts similar effects as the mold 93 in the above embodiment. The mold 93 in the second modification, however, is different from that in the above embodiment in the manner of forming the resistive wall.

Specifically, referring to FIG. 10, a groove 13 is formed on the first sidewall 12A. The groove 13 extends parallel to the bottom wall 11. Of the wall surfaces defining the groove 13, the wall surface inclined with respect to a plane parallel to the axis α direction of the spindle 95 so as to face the bottom wall 11 side is a resistive wall 13A. The resistive wall 13A is, of the wall surfaces defining the groove 13, the wall on a side opposite to the bottom wall in the axis α direction. On the first sidewall 12A of the cavity 10, the resistive wall 13A is formed which is the wall surface inclined with respect to a plane parallel to the axis α direction of the spindle 95 so as to face the bottom wall 11 side. Of the wall surfaces defining the groove 13, the wall surface opposing the resistive wall 13A faces the opening side of the mold 93. The resistive wall 13A is a wall surface constituting a recess formed on the first sidewall 12A.

Third Modification

Figure 11:
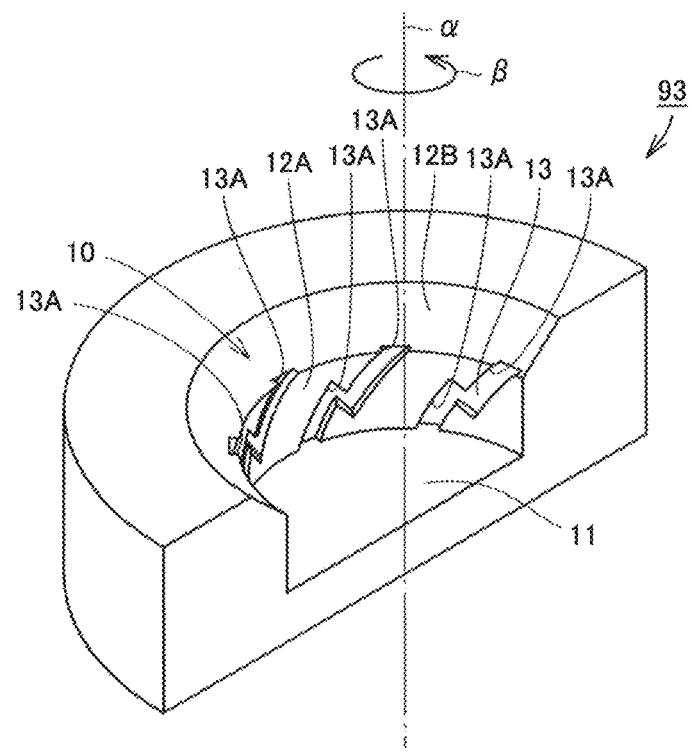
FIG. 11 is a schematic perspective view showing the structure of a mold according to a third modification.

FIG. 11 is a schematic perspective view showing the structure of a mold according to a third modification. Referring to FIG. 11, a mold 93 in the third modification basically has a similar structure and exerts similar effects as the mold 93 in the above embodiment. The mold 93 in the third modification, however, is different from that in the above embodiment in the manner of forming the resistive wall.

Specifically, referring to FIG. 11, a plurality of grooves 13 are formed on the first sidewall 12A. The grooves 13 are formed to extend from the bottom wall 11 side toward the second sidewall 12B side on the first sidewall 12A. A groove 13 has a structure in which a pair of grooves, formed inclined with respect to the axial direction (along the axis α) so as to extend from the second sidewall 12B side toward the bottom wall 11 side in the direction of rotation of the spindle 95 (direction indicated by the arrow β), are connected to each other via a groove that is formed inclined toward a side opposite to the pair of grooves. Of the wall surfaces defining a groove 13, the wall surface inclined with respect to a plane parallel to the axis α direction of the spindle 95 so as to face the bottom wall 11 side is a resistive wall 13A. The resistive wall 13A is, of the wall surfaces defining the groove 13, the wall on a side opposite to the bottom wall 11 in the axis α direction. On the first sidewall 12A of the cavity 10, the resistive wall 13A is formed which is the wall surface inclined with respect to a plane parallel to the axis α direction of the spindle 95 so as to face the bottom wall 11 side. The resistive wall 13A is a wall surface constituting a recess formed on the first sidewall 12A.

Fourth Modification

Figure 12:
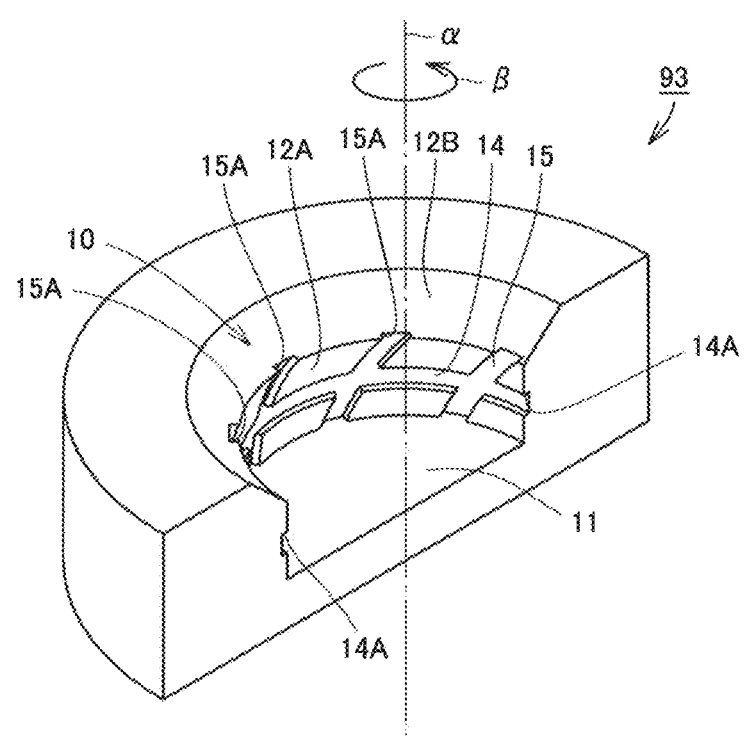
FIG. 12 is a schematic perspective view showing the structure of a mold according to a fourth modification.

FIG. 12 is a schematic perspective view showing the structure of a mold according to a fourth modification. Referring to FIG. 12, a mold 93 in the fourth modification basically has a similar structure and exerts similar effects as the mold 93 in the above embodiment. The mold 93 in the fourth modification, however, is different from that in the above embodiment in the manner of forming the resistive wall.

Specifically, referring to FIG. 12, a groove 14 that extends parallel to the bottom wall 11 and a plurality of grooves 15 that extend from the bottom wall 11 side toward the second sidewall 12B side to traverse the groove 14 are formed on the first sidewall 12A. The grooves 15 have a structure similar to those of the grooves 13 in the above embodiment. The groove 14 has a structure similar to that of the groove 13 in the second modification described above. In the fourth modification, the grooves 13 in the above embodiment and the groove 13 in the second modification are combined. Of the wall surfaces defining the groove 14, the wall surface inclined with respect to a plane parallel to the axis α direction of the spindle 95 so as to face the bottom wall 11 side is a resistive wall 14A. Of the wall surfaces defining the groove 14, the resistive wall 14A faces the bottom wall 11 side, while the wall surface opposing the resistive wall 14A faces the opening side of the mold 93. Of the wall surfaces defining a groove 15, the wall surface inclined with respect to a plane parallel to the axis α direction of the spindle 95 so as to face the bottom wall 11 side is a resistive wall 15A. On the first sidewall 12A of the cavity 10, the resistive walls 14A and 15A are formed which are the wall surfaces inclined with respect to a plane parallel to the axis α direction of the spindle 95 so as to face the bottom wall 11 side. The resistive walls 14A and 15A are wall surfaces each constituting a recess formed on the first sidewall 12A.

Fifth Modification

Figure 13:
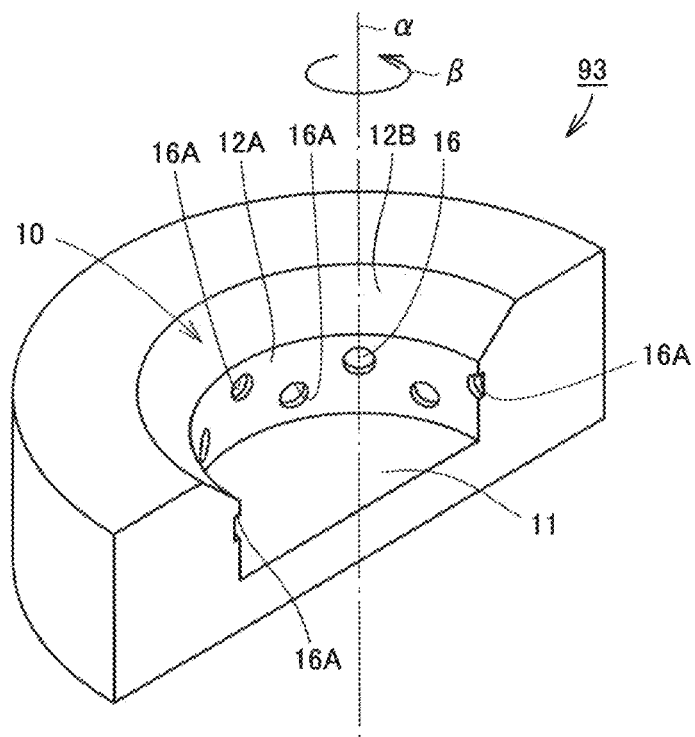
FIG. 13 is a schematic perspective view showing the structure of a mold according to a fifth modification.

FIG. 13 is a schematic perspective view showing the structure of a mold according to a fifth modification. Referring to FIG. 13, a mold 93 in the fifth modification basically has a similar structure and exerts similar effects as the mold 93 in the above embodiment. The mold 93 in the fifth modification, however, is different from that in the above embodiment in the manner of forming the resistive wall.

Specifically, referring to FIG. 13, a plurality of recesses 16 are formed on the first sidewall 12A. A recess 16 is defined by a circular bottom wall and a peripheral wall which is a cylindrical surface connected to the bottom wall. Of the peripheral wall defining the recess 16, a region inclined with respect to a plane parallel to the axis α direction of the spindle 95 so as to face the bottom wall 11 side is a resistive wall 16A. The resistive wall 16A is an upper half of the peripheral wall defining the recess 16, on the side opposite to the bottom wall in the axis α direction. On the first sidewall 12A of the cavity 10, the resistive walls 16A are formed each being the wall surface inclined with respect to a plane parallel to the axis α direction of the spindle 95 so as to face the bottom wall 11 side. The resistive wall 16A is a wall surface constituting a recess formed on the first sidewall 12A.

Sixth Modification

Figure 14:
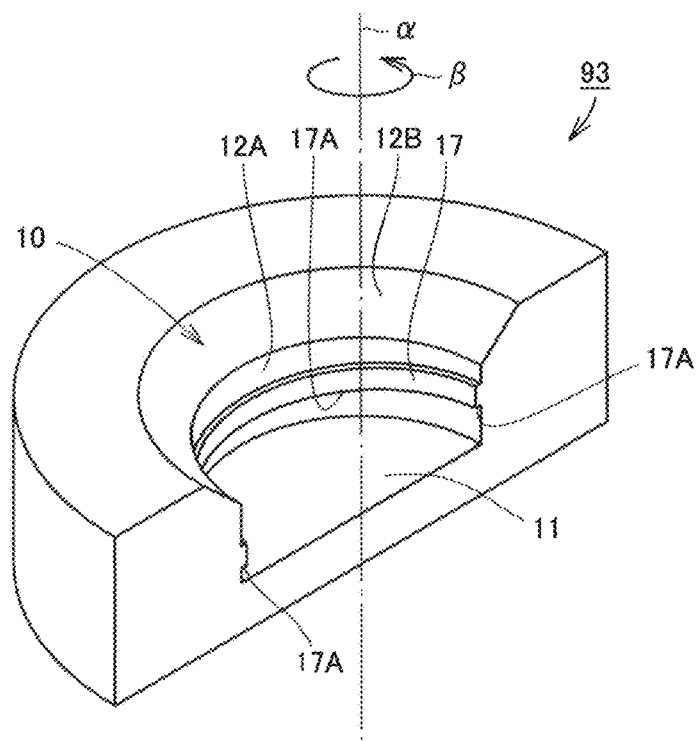
FIG. 14 is a schematic perspective view showing the structure of a mold according to a sixth modification.

FIG. 14 is a schematic perspective view showing the structure of a mold according to a sixth modification. Referring to FIG. 14, a mold 93 in the sixth modification basically has a similar structure and exerts similar effects as the mold 93 in the above embodiment. The mold 93 in the sixth modification, however, is different from that in the above embodiment in the manner of forming the resistive wall.

Specifically, referring to FIG. 14, a ridge 17 is formed on the first sidewall 12A. The ridge 17 is formed helically to extend in the circumferential direction of the first sidewall 12A. The ridge 17 is formed helically such that, in the direction of rotation of the spindle 95 (direction of the arrow β), it approaches the bottom wall 11 side from the second sidewall 12B side. Of the wall surfaces forming the ridge 17, the wall surface that is inclined with respect to a plane parallel to the axis α direction of the spindle 95 so as to face the bottom wall 11 side is a resistive wall 17A. The resistive wall 17A is, of the wall surfaces forming the ridge 17, the wall on the bottom wall side in the axis α direction (on the rear side in the direction of rotation of the spindle 95). On the first sidewall 12A of the cavity 10, the resistive wall 17A being the wall surface inclined with respect to a plane parallel to the axis α direction of the spindle 95 so as to face the bottom wall 11 side is formed. The resistive wall 17A is formed helically to approach the bottom wall 11 side from the second sidewall 12B side in the direction of rotation of the spindle 95 (direction indicated by the arrow β). The resistive wall 17A is a wall surface constituting a projection formed on the first sidewall 12A.

EXAMPLES

The procedure from the step S10 to the step S50 in the above embodiment were carried out to create a test piece having the base member and the sliding member joined by enclosed friction welding (Example). For comparison, another test piece was prepared which was created in a similar procedure except that a mold having no resistive wall formed was used (Comparative example). Appearances of the test pieces of the Example and the Comparative example were observed. Further, ultrasonic testing was performed on each of the test pieces, on the joint portion between the base member and the sliding member.

Figure 15:
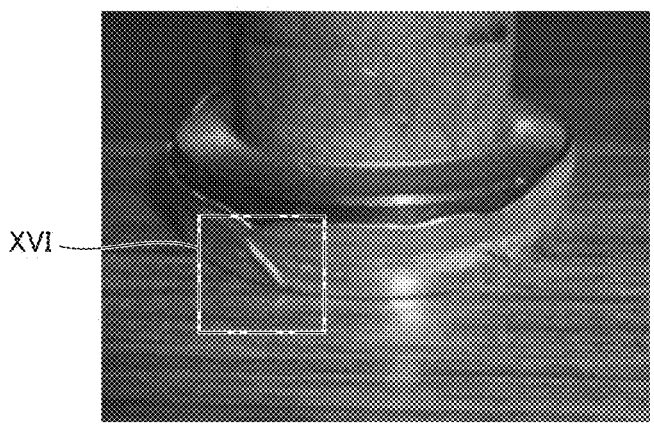
FIG. 15 is a photograph showing the appearance of a test piece after joining (Example)
Figure 16:
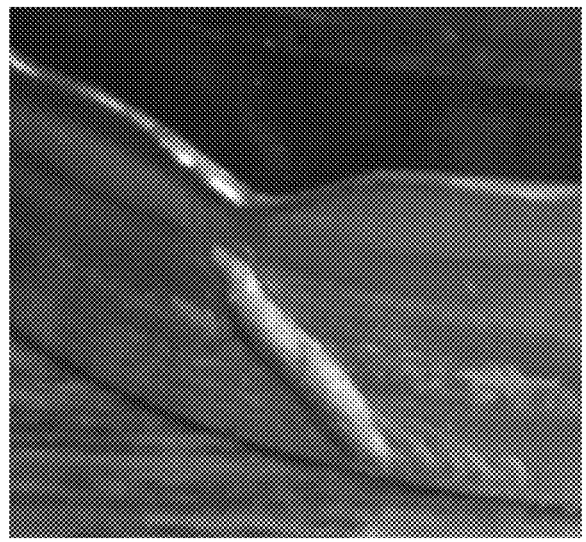
FIG. 16 is a photograph showing a part of FIG. 15 in enlarged view.
Figure 17:
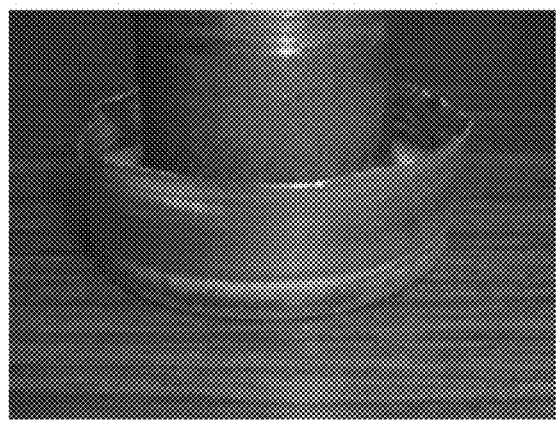
FIG. 17 is a photograph showing the appearance of a test piece after joining (Comparative example)

FIG. 15 is a photograph showing the appearance of a test piece of the Example. FIG. 16 is a photograph showing a part of FIG. 15 (region corresponding to the region XVI in FIG. 15) in enlarged view. FIG. 17 is a photograph showing the appearance of a test piece of the Comparative example. Referring to FIGS. 15 and 17, it is confirmed that the formation of the flash has been suppressed in the test piece of the Example compared to the test piece of the Comparative example. Further, referring to FIG. 16, on the test piece of the Example, a projection corresponding to the groove (resistive wall) formed on the mold has been formed. From these, it is confirmed that forming the groove (resistive wall) on the mold can suppress the formation of the flash.

Figure 18:
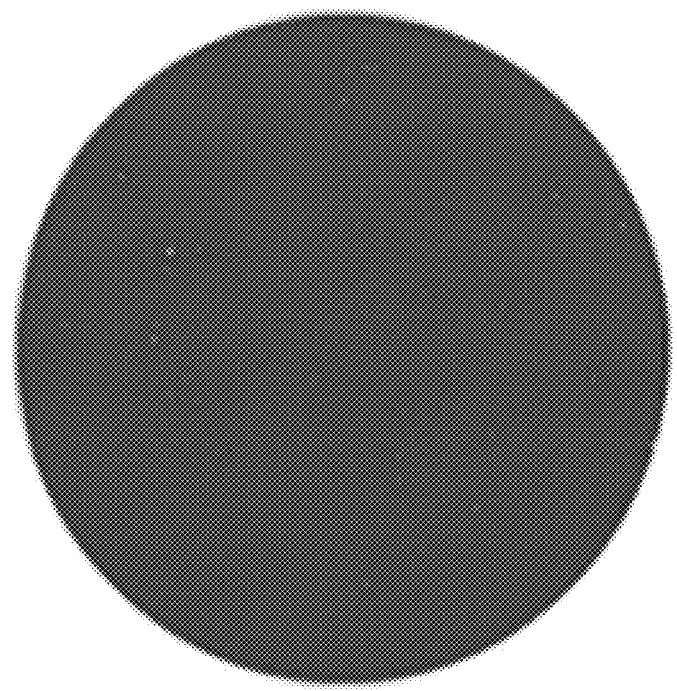
FIG. 18 shows a result of ultrasonic testing (Example)
Figure 19:
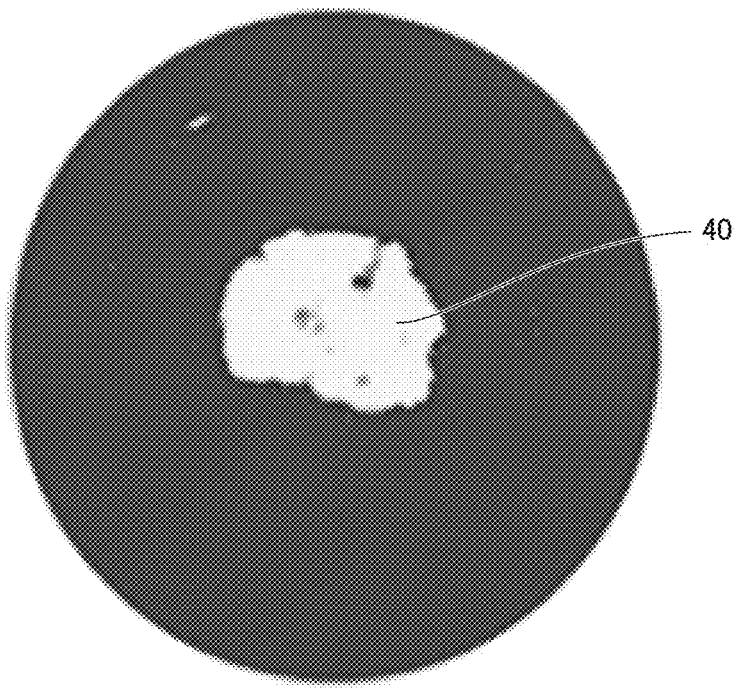
FIG. 19 shows a result of ultrasonic testing (Comparative example).

FIG. 18 shows a result of the ultrasonic testing conducted on the test piece of the Example. FIG. 19 shows a result of the ultrasonic testing conducted on the test piece of the Comparative example. Referring to FIG. 19, in the test piece of the Comparative example, an unjoined region 40 is formed at and around the center. In contrast, referring to FIG. 18, no unjoined region is found in the test piece of the Example. It is conceived that in the test piece of the Example, the frictional heat drained off to the flash has been reduced and, thus, the frictional heat that should contribute to the joining has remained in a large amount in the vicinity of the contact surface, whereby formation of an unjoined region has been avoided.

From the test results described above, it is confirmed that according to the metal member producing method and the metal member producing device in the present invention, it is possible to produce a metal member having members made of different metals directly joined firmly to each other.

It should be understood that the embodiments and examples disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The metal member producing method and the metal member producing device according to the present invention are applicable particularly advantageously to production of a metal member having a structure in which members made of different metals are directly joined to each other.

DESCRIPTION OF REFERENCE NUMERALS

1: piston shoe; 1A: surface; 2: base section; 3: sliding section; 4: base member; 4A: base member contact surface; 4B: disk portion; 4C: cylindrical portion; 5: sliding member; 5A: sliding member contact surface; 9: enclosed friction welding device; 10: cavity; 11: bottom wall; 12A: first sidewall; 12B: second sidewall; 13: groove; 13A: resistive wall; 14: groove; 14A: resistive wall; 15: groove; 15A: resistive wall; 16: recess; 16A: resistive wall; 17: ridge; 17A: resistive wall; 21: spherical portion; 21A: flat part; 22: disk portion; 23: base section joint surface; 24: base section joint region; 29: center hole; 29A: first region; 29B: second region; 29C: third region; 29D: fourth region; 31: sliding surface; 31A: groove; 32: sliding section joint surface; 34: sliding section joint region; 40: unjoined region; 90: frame; 90A: shaft; 90B: spindle moving motor; 90C: spindle support portion; 91: base body; 92: mold holder; 92A: mold holding portion; 93: mold; 94: chuck; 95: spindle; 95B: spindle motor; 96: load sensor; 97: driving portion; 98: base portion; and 99: part.

The invention claimed is:

1. A metal member producing device, the device comprising:
   a spindle;
   a base portion arranged spaced apart from the spindle in an axial direction;
   a driving portion configured to drive at least one of the spindle and the base portion in the axial direction of the spindle;
   a first holding portion configured to hold a first member disposed on one of the spindle and the base portion; and
   a mold configured to hold a second member disposed on the other of the spindle and the base portion to oppose the first holding portion, the mold including
- a bottom wall, and
- an annular sidewall extending from the bottom wall in a direction that intersects the bottom wall, the annular sidewall encircling an entire circumference of the second member, the annular sidewall having a resistive wall formed thereon, the resistive wall being a wall surface inclined with respect to a plane parallel to the axial direction of the spindle so as to face the bottom wall.

2. The metal member producing device according to claim 1, wherein the resistive wall is a wall surface constituting a recess or a projection formed on the sidewall.

3. The metal member producing device according to claim 1, wherein the resistive wall extends to approach the bottom wall in a direction of rotation of the spindle.

4. The metal member producing device according to claim 1, wherein at least one of the spindle and the base portion has mounted thereon a load sensor configured to detect a contact load between the first member and the second member.

* * * * *